US005220223A

United States Patent [19]

Mehnert

[11] Patent Number: 5,220,223

[45] Date of Patent: Jun. 15, 1993

[54] DYNAMOELECTRIC MACHINE

[76] Inventor: Walter Mehnert, Grillparzer Strasse 6, 8012 Ottobrunn, Fed. Rep. of Germany

[21] Appl. No.: 655,607

[22] Filed: Feb. 15, 1991

[30] Foreign Application Priority Data

Feb. 16, 1990 [DE] Fed. Rep. of Germany ....... 4005045

[51] Int. Cl.[5] ...................... H02K 33/02; H02K 41/02

[52] U.S. Cl. ........................................ 310/14; 310/30; 310/15

[58] Field of Search ....................... 310/14, 15, 17, 23, 310/28, 30, 261, 112; 335/230, 255, 281, 256

[56] References Cited

U.S. PATENT DOCUMENTS 3,190,608 6/1965 Hassa .................................. 335/256
3,321,652 5/1967 Opel .................................. 310/168
3,943,390 3/1976 Ochiai .................................. 310/15
4,697,113 9/1987 Young .................................. 310/15

FOREIGN PATENT DOCUMENTS 3008534 9/1980 Fed. Rep. of Germany .
513515 2/1921 France .
251509 8/1948 Switzerland .
2205003 11/1988 United Kingdom .

*Primary Examiner*—Steven L. Stephan
*Assistant Examiner*—Judson H. Jones
*Attorney, Agent, or Firm*—Sughrue, Mion, Zinn, Macpeak & Seas

[57] ABSTRACT

In an electric motor (11) with at least one winding (14) through which an electric current flows to produce a relative movement between a stator portion and a reaction portion, with at least one magnet (12), the field of which passes through the winding, and with at least one body (20) of ferromagnetic material which is arranged in the fields of the magnet and winding in order to achieve the minimum structural configuration with the maximum outputtable force, it is provided that the winding is immovably connected to the magnet at least in the direction of the relative movement and that the body of ferromagnetic material is mounted movably relative to the winding and the magnet in the direction of the relative movement, and has an air gap (22) which extends transversely to said direction of relative movement and which is so arranged that the magnetic flux in the winding alters as a result of the relative movement of the air gap with respect to the winding and the magnet.

48 Claims, 5 Drawing Sheets

1
9
2
7
3
4
6
10
8
$L_S$
h 11
20
25
24
21
23
15
12
22
h
14
16
21
23'
18
26

45
42
41
32
40
h
34
41
44
46

VIII
VII
76
54
52
63
68
70
78
56
51
77
60
72
55
62
65
66
R
58
59
74
75
53

51
68
52
76

59
65
82
80
75
53

51
VI
68
76
52
59

75
65
X
82
80
68
59
53

DYNAMOELECTRIC MACHINE

BACKGROUND OF THE INVENTION

The invention relates to a miniaturized dynamoelectric machine structure.

Such machine structures are known for example in the form of linear motors which, to produce a limited stroke movement, include a hollow permanent magnet which is in the form of a straight circular cylinder. An electrical winding passes into the field of the permanent magnet which is firstly directed inwardly and is then deflected by means of a magnetic yoke arrangement parallel to the longitudinal axis towards an end of the permanent magnet. Depending on the direction of the current flowing through the electrical winding, the electrical winding moves closer towards or away from the end of the arrangement, through which the main portion of the magnetic flux passes. With such an arrangement, a uniform force effect can be achieved only as long as the winding is enclosed by the permanent magnet over practically the entire axial length of the winding. Therefore the permanent magnet must be longer in the axial direction than the winding by the desired stroke movement.

That means that the known electric motors are not of the optimum nature in regard to the requirement of producing a maximum force or a maximum moment, while being of minimum structural size.

SUMMARY OF THE INVENTION

In comparison therewith the invention is based on the object of so developing an electric motor of the kind set forth in the opening part of this specification that the structural size can be considerably reduced, with at least the same outputtable force or moment.

In accordance with the invention the underlying principle of the known electric motors that a winding through which current flows moves either alone or jointly with a core, which passes therethrough, of ferromagnetic material, relative to the field of a magnet is relinquished. Instead the winding and the magnet which can be formed both by a permanent magnet and also an electromagnet are immovably connected together at least in the direction of the movement to be produced but generally entirely, so that the movement to be produced by the motor cannot occur between those two components. Instead, a body of ferromagnetic material is so mounted in the fields of the winding and the magnet that it is displaceable in the direction of the desired movement relative to the winding-magnet unit. In that arrangement, just as in the known electric motors, the winding-magnet unit can be considered either as the 'stator' or as the 'reaction member' or 'rotor', in which case the body of ferromagnetic material forms the respective co-operating portion.

So that the desired relative movement takes place, the body of ferromagnetic material has a gap which extends through the body transversely to the desired direction of movement in such a way that the resistance which the body opposes in the region of the gap to a magnetic flux is greater than the magnetic resistance which is produced by the bearing gaps between the winding-magnet arrangement and the body of ferromagnetic material. For that purpose, at least over a considerable part of the cross-section of the body, the gap is filled by a nonferromagnetic material which does not necessarily have to be air, or by vacuum. All those options are referred to hereinafter for the sake of brevity by means of the term 'gap'. That also applies in regard to 'air gaps' which are also described in greater detail hereinafter and which are provided at other locations in the motor arrangement according to the invention.

The important consideration is that the gap which is to be passed through the body of ferromagnetic material is so arranged that the magnetic flux passing through the gap is altered by virtue of its movement relative to the winding-magnet unit. That movement can be produced by an external mechanical moment or an external mechanical force acting on the reaction portion of the electrical machine. As a result of that movement, the magnetic flux passing through the winding alters and a voltage is induced in the winding, which can be taken off at the winding terminals. That represents drive of the arrangement according to the invention as a generator. Conversely, in the case of a current which is passed through the winding from the outside, a force is produced between the winding-magnet unit and the body of ferromagnetic material, and that force, with a comparable structural size, is greater by more than a factor of 2 than in the case of electric motors of conventional comparable kind.

A particularly compact structural configuration can be achieved, with a predetermined force or moment to be produced, if the arrangement is so designed that magnetic stray fields which are as low as possible occur.

The reduction in structural size which can be achieved by virtue of the integers according to the invention may be particularly clearly seen by reference to the example of an electric motor which is designed for a limited linear stroke movement, but it also applies in a corresponding fashion in regard to other structural configurations and functional forms.

As already mentioned, in the case of conventional linear motors which are designed for a restricted stroke movement, the magnet must be longer by the stroke distance than the winding which is arranged coaxially with respect thereto, so that in all its positions through which it passes in the case of a stroke movement, the winding is disposed as completely as possible in field regions of the magnet which have a high field line density. In an electric motor according to the invention of the kind with which we are concerned here in contrast the magnet must be substantially of the length of the desired stroke movement as the air gap to be passed through the body of ferromagnetic material can move back and forth between the two axial ends of the magnet. The winding through which the current flows can be arranged similarly to the case of known comparable motors, concentrically with respect to the permanent magnet, but in this case fixedly, and it is then of the same axial length. That therefore provides an electric motor arrangement which in the direction of movement is only immaterially longer than the stroke movement to be produced.

As an alternative thereto however, instead of one winding, it is also possible to provide two windings and to arrange them in such a way that the magnet is disposed between them.

The shorter structural configuration for the magnet further has the result that the magnetic flux which overall originates therefrom is lower, to produce the same force. In that case, when using a magnetic yoke arrangement of ferromagnetic material, which is advantageous in order to achieve a high level of efficiency, substantially smaller thicknesses of material can be used for the magnetic yoke arrangement and the body of ferromagnetic material, without involving the risk of magnetic saturation. The reduced thicknesses of material referred to above again result in reductions in structural size, in particular perpendicularly to the direction of the desired relative movement.

The above-discussed structural configuration is particularly suitable for a rotary motor which differs from the described linear motors in that in the rotary motor the magnet arrangement includes at least two magnets which are arranged in mutually opposite relationship with respect to the longitudinal axis of the core and which preferably have mutually different directions of magnetisation such that at any time being considered the direction of magnetisation of at least one magnet is directed from the outside towards the core while that of at least one magnet is directed away from the core outwardly. In addition in that arrangement the core is mounted rotatably with respect to the winding and magnet arrangement and has a gap which preferably extends over such a distance both unilaterally transversely with respect to the longitudinal direction of the core and also in the longitudinal direction thereof that in the assembled condition it bridges over the axial spacing between the two windings.

A particular advantage of the features according to the invention is that the movable portion of the electric motor can be the simplest possible conceivable article, namely a slit iron cylinder.

That advantage is retained even when the portion which is movable relative to the winding-magnet arrangement is the casing of ferromagnetic material which encloses the arrangement and through which passes a gap which extends transversely to the direction of movement. Thus the casing, instead of the core or jointly with the core, can form the ferromagnetic body which is movable relative to the winding-magnet arrangement.

At the junctions between the yokes and the body of ferromagnetic material which has the air gap, it may turn out to be advantageous to introduce a ferromagnetic fluid, preferably an oil-based fluid, in order to reduce the coefficient of friction, to seal off the motor housing relative to the exterior and above all to reduce the magnetic forces which occur due to eccentricities.

The invention is described hereinafter by means of embodiments with reference to the drawings in which:

DETAILED DESCRIPTION OF THE PREFERRED EMBODIMENTS

Figure 1:
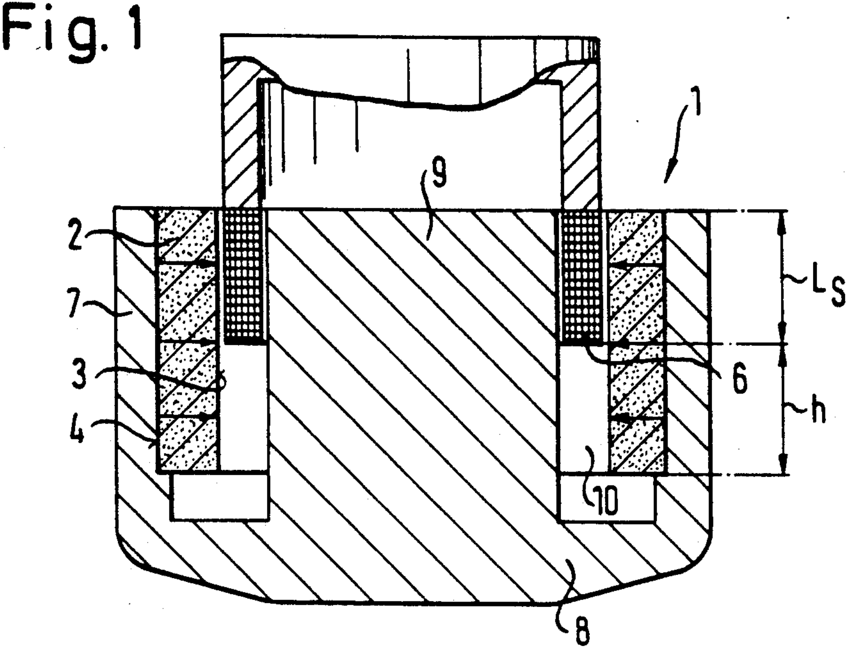
FIG. 1 shows an electric motor designed for a linear stroke movement, in accordance with the state of the art.

The electric motor 1 shown in FIG. 1 which is designed on the moving coil principle includes a permanent magnet 2 which is in the form of a hollow straight circular cylinder open at both ends, and which is so magnetised that for example its magnetic South Pole is on the inside cylindrical surface 3 thereof and the magnetic North Pole is on the outside cylindrical surface 4 thereof. Arranged in the interior of the permanent magnet 2 is an electrical winding 6 which is also in the form of a hollow straight circular cylinder and the outside diameter of which is somewhat smaller than the inside diameter of the permanent magnet 2. The axial length $L_S$ of the winding 6 is approximately half the axial length of the permanent magnet 2 so that, when the winding 6 is disposed concentrically with respect to the permanent magnet in the interior thereof, it can move back and forth in the interior of the permanent magnet by a stroke movement h which is approximately equal to the axial length $L_S$ of the winding 6 and half the axial length of the permanent magnet 2.

So that the lines of magnetic flux of the permanent magnet 2 can be closed over a path with the minimum level of magnetic resistance, the electric motor 1 includes a magnetic return path arrangement of ferromagnetic material, which has the following components: a casing 7 in the form of a hollow straight circular cylinder which is of the same axial length as the permanent magnet 2 and which surrounds same from the outside in such a way that the inside cylindrical surface of the casing 7 bears against the outside cylindrical surface 4 of the permanent magnet 2, a yoke arrangement 8 which is substantially in the form of a circular disc and forms the end wall of the casing 7, which is the lower end wall in FIG. 1, and a core 9 which is in the form of a straight circular cylinder and which extends from the inside surface of the yoke arrangement 8 concentrically over the entire length of the permanent magnet 2 to the end thereof which is the upper end in FIG. 1. The entire magnetic return path means and therewith both the casing 7 and also the core 9 are immovably connected to the permanent magnet 2. The portion which is movable relative thereto is formed by the winding 6 which can move up and down in a cavity which is provided between the cylindrical outside surface of the core 9 and the cylindrical inside surface 3 of the permanent magnet 2 and which is in the form of a straight circular cylindrical ring. In order to permit that movement, suitable air gaps are left free between the core 9 and the inside surface of the winding 6, and the inside cylindrical surface 3 of the permanent magnet 2 and the outside peripheral surface of the winding 6 respectively.

The magnetic flux lines which pass radially inwardly from the inside surface 3 of the permanent magnet 2 are substantially deflected in the core 9 in such a way that they extend in the longitudinal direction through the core 9 to the yoke arrangement 8 which passes them radially outwardly where they are returned by the casing 7 in the longitudinal direction to such a position that they pass by way of the outside surface 4 into the permanent magnet 2 again, where they can close to themselves again.

The diameter of the core 9 must be such that, in the region in which it opens into the yoke arrangement 8, it is not driven into a condition of saturation by the entire magnetic flux which passes through it at that location and which is composed of the flux from the permanent magnet 2 and the flux from the winding 6. In comparison the axial width of the yoke arrangement 8 can be clearly less; it is a quarter of the core diameter. As the casing 7 is also not to be driven into a condition of saturation, its cross-sectional area may not be less than that of the core 9. That however can be achieved with a substantially smaller thickness of material as the casing 7 is at a greater radial spacing from the axis of symmetry.

The winding 6 is shown in FIG. 1 in the upper limit position in respect of its stroke movement h. If it is acted upon in that position by a current of suitable polarity, then it moves downwardly in FIG. 1 until it butts against the yoke arrangement 8, with the magnetic flux originating from the permanent magnet 2 and passing through the winding 6 constantly increasing. If in the lower limit position the current flowing through the winding 6 is reversed in polarity, it moves upwardly again into the limit position shown in FIG. 1, with the magnetic flux flowing through it progressively decreasing.

Figure 2:
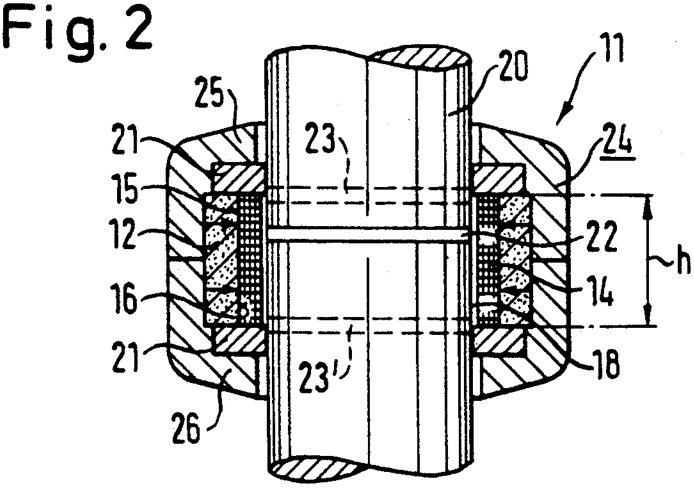
FIG. 2 shows a first embodiment of an electric motor designed for the same linear stroke movement, in accordance with the invention.

Referring to FIG. 2, the embodiment illustrated therein of an electric motor 11 according to the invention, which is also designed for a linear stroke movement h, again has a permanent magnet 12 in the form of a hollow straight circular cylinder which is open at both ends and which is magnetised in the same manner as the permanent magnet 2 in FIG. 1 but which is of only approximately the length of the required stroke movement h, that is to say practically only half the length of the permanent magnet 2.

Disposed in the interior of the permanent magnet 12 and concentrically with respect thereto is a winding 14 which is also in the form of a straight hollow circular cylinder and which is of approximately the same axial length as the permanent magnet 12 and which bears with its outside cylindrical surface 15 against the inside cylindrical surface 16 of the permanent magnet 12 and is fixedly connected thereto, in particular being immovable in the longitudinal direction of the arrangement.

A core 20 of ferromagnetic material extends through the internal space 18 which is enclosed by the winding 14 and which is open at both ends. The core 20 is mounted by means of two guide discs 21 which comprise non-ferromagnetic material and which are arranged at the axial ends of the winding 14, in such a way that the core 20 can reciprocate in its longitudinal direction. For that purpose each of the two guide discs 21 has a central opening, the shape of which is matched to the cross-sectional shape of the core 20 and the internal width of which is such that the core 20 is slidably guided by the two discs 21.

Transversely to its longitudinal direction the core 20 has an 'air gap' 22, that is to say a cross-sectional region which at least for the major part is filled by a material (and that is also to be considered as including vacuum) which does not have ferromagnetic properties. That air gap 22 therefore represents a region of high magnetic resistance which means that the magnetic flux lines which extend radially inwardly from the permanent magnet 12 and which pass through the body of the winding 14, in the position of the air gap 22 shown in FIG. 2, are divided by same in such a way that the magnetic flux lines extending above the air gap 22 are bent round upwardly and are passed through the ferromagnetic core 20 to the upper end of the arrangement, while the magnetic flux lines extending beneath the air gap 22 are deflected downwardly and passed to the lower end. The result of that is that, when the core 20 is moved upwardly or downwardly out of the position shown in FIG. 2 or a similar position, depending on the polarity of the current flowing through the winding 14, magnetic flux lines which previously passed through the interior 18 of the winding 14 in one direction (for example downwardly) are obliged to reverse that direction and to pass through the space 18 in the opposite direction. That means that with the same magnetic field strength but half the length of the magnet 12, the magnetic flux change in respect of time, through the winding 14, which occurs per unit of length of displacement of the core 20, is just as great as in the case of the embodiment shown in FIG. 1. That means that the force is more than twice as great, in relation to a magnet of the same length.

In the embodiment shown in FIG. 2, the gap 22 moves between two end or limit positions 23, 23' which are indicated by broken lines and each of which is defined by virtue of the center line of the gap, which is horizontal in FIG. 2, coinciding with the upper and lower end edge respectively of the winding 14. It will be seen that, with a motor of such a design configuration, both the winding 14 and also the magnet 12 which is of substantially the same length only have to be of the length of the desired stroke movement h. That therefore results in the structural size being minimised in the axial direction.

In this case also the return of the magnetic flux which extends radially inwardly from the permanent magnet 12 and which is deflected in the longitudinal direction in the core 20 is effected by means of a casing 24 which surrounds the magnet 12 from the exterior and a yoke arrangement which magnetically connects the core 20 to the casing 24 in the radial direction and which here comprises two yokes 25 and 26. The yokes 25 and 26 are substantially in the form of circular discs which decrease in cross-sectional size in a radially outward direction, each having a respective central opening therethrough. One opening is arranged at the upper end of the motor 11 while the other is arranged at the lower end. The two yokes 25, 26 are fixedly connected to the casing 24 and, like same, comprise a ferromagnetic material. The diameters of the central openings which permit the core 20 to pass through the yokes 25 and 26 are such that the air gap formed between the core 20 and the yokes 25 and 26 is admittedly small in comparison with the gap 22, but it is large in comparison with the air gaps existing in relation to the guide discs 21. That provides that the frictional forces which occur as a result of eccentricities in regard to guidance effect between the yokes 25, 26 and the core 22 are kept very low. The width of the air gap between the core 20 and the magnet 12 disposed therearound is greater than the width of the air gap present in relation to the guide discs 21 and in particular larger than the width of the air gaps between the core 20 and the yokes 25 and 26. The smallest gap is between the guide discs 21 and the core 20. In that case the guide discs 21 not only reduce the eccentricity forces but fill the necessary spaces between the yokes 25, 26 and the magnet 12.

As in the embodiment according to the invention as shown in FIG. 2, the magnet 12 only has to be half the length of the permanent magnet shown in FIG. 1 in order to produce the stroke movement h, the magnetic flux which it produces is also only half as great, with the same magnetic strength. In the embodiment shown in FIG. 2, when the gap 22 is in one of the two end or limit positions, the core 20 must carry the whole of the magnetic flux of the magnet 12 in the longitudinal direction to the yoke 25 or the yoke 26 which is in opposite relationship to the gap 22, and because the winding flux in both embodiments shown in FIGS. 1 and 2 is approximately equal at the highly loaded parts of the core, the diameter of the core 20 at a maximum only has to be $1/\sqrt{2}$ times as great as in the embodiment shown in FIG. 1. Therefore, the arrangement according to the invention, while involving the same force, provides not only a reduction in length but also a substantial reduction in structural size perpendicularly to the longitudinal direction.

A similar point also applies in regard to the embodiment shown in FIG. 3 which is again designed to provide a stroke movement h. Here too the magnet 32 and the winding 34 are in the form of hollow straight circular cylinders of the same axial length. Unlike the embodiment shown in FIG. 2 however in this case the winding 34 is of an inside diameter which is equal to the outside diameter of the permanent magnet 32 so that in the assembled condition the winding 34 embraces the permanent magnet 32. Those two components are again immovably connected together in the longitudinal direction. Again, provided at the two ends of the winding-magnet arrangement are two non-ferromagnetic guide discs 41 which also serve to mount the casing 44 which is displaceable relative to the remainder of the assembly. The casing 44, like the core 40 which is immovably connected to the two yokes 45, 46 and the winding-magnet arrangement in the longitudinal direction, comprises ferromagnetic material. The casing 44 which is displaceable in the longitudinal direction comprises in this embodiment an 'air gap' 42 which extends transversely to the direction of movement and which, as described above in relation to the gap 22, is filled at least in regard to the predominant portion thereof with any non-ferromagnetic material. The casing 44 slides with its inside cylindrical surface on the outside surfaces of the guide discs 41 and is separated from the yokes 45, 46 and the winding 34 by air gaps in the same manner as described above in relation to the core 20. The casing 44 can reciprocate between two limit or end positions which are defined by the center line of the gap 42, which extends horizontally in FIG. 3, being aligned with the upper and lower ends respectively of the winding-magnet arrangement. The mode of operation of this embodiment is the same as the embodiment shown in FIG. 2. The magnetic flux is of the same configuration as was described above.

Figure 3:
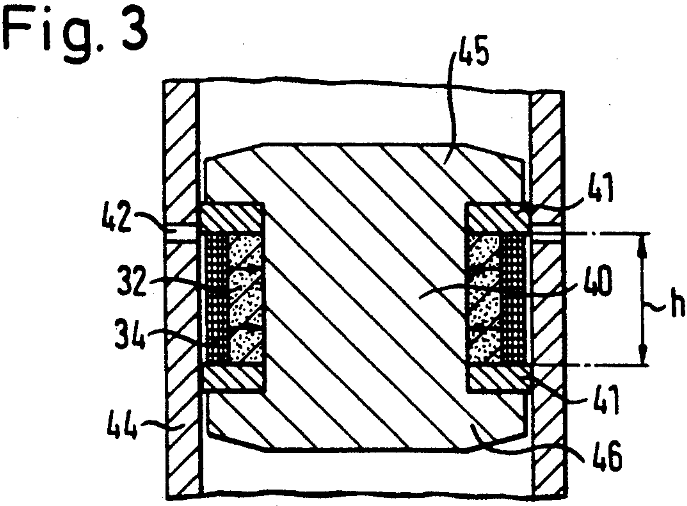
FIG. 3 shows a further embodiment of an electric motor according to the invention, which is designed for the same linear stroke movement.

The embodiment shown in FIG. 3 has the advantage over the embodiment shown in FIG. 2 that the friction which occurs in the event of eccentric support due to asymmetrically acting magnetic forces between the yokes and the movable body is correspondingly smaller because of the magnetic field strength which is lower in the greater radial spacing.

Figure 4:
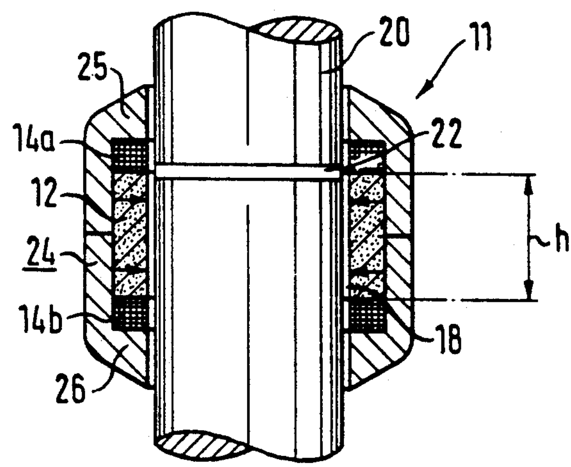
FIG. 4 shows an embodiment which is designed for the same linear stroke movement and in which the winding is divided.

In the embodiment shown in FIG. 4 which is of a structure similar to that shown in FIG. 2 and in which the same components are denoted by the same references, the outside diameter is further reduced by virtue of the fact that the winding 14 is not arranged concentrically relative to the magnet 12 but is divided into two parts 14*a* and 14*b* which can be operated in electrical serial or parallel relationship. In that arrangement the non-ferromagnetic cavities required at the ends of the magnet 12 between same and the yokes 25, 26 of the magnetic return path means are used to accommodate the two winding parts 14*a* and 14*b*. That construction affords the advantage that, besides the minimum length which is also to be found in the other embodiments in accordance with the invention, the magnet 12 is now also radially minimised because the magnetic resistance between the casing 24 and the core 20 is substantially only determined by the magnet 12. That means that the field strength can be increased and thus the current of the winding can be reduced. Moreover the diameter of the core 20 is further reduced because dividing the winding 14 means that half the winding transverse flux disappears, in comparison with the preceding embodiments. In that arrangement the edges of the air gap are preferably rounded off.

With this alternative form also it is possible to provide a construction in which, as shown in FIG. 3, a casing having an air gap is mounted displaceably with respect to the remainder of the arrangement.

Figure 5:
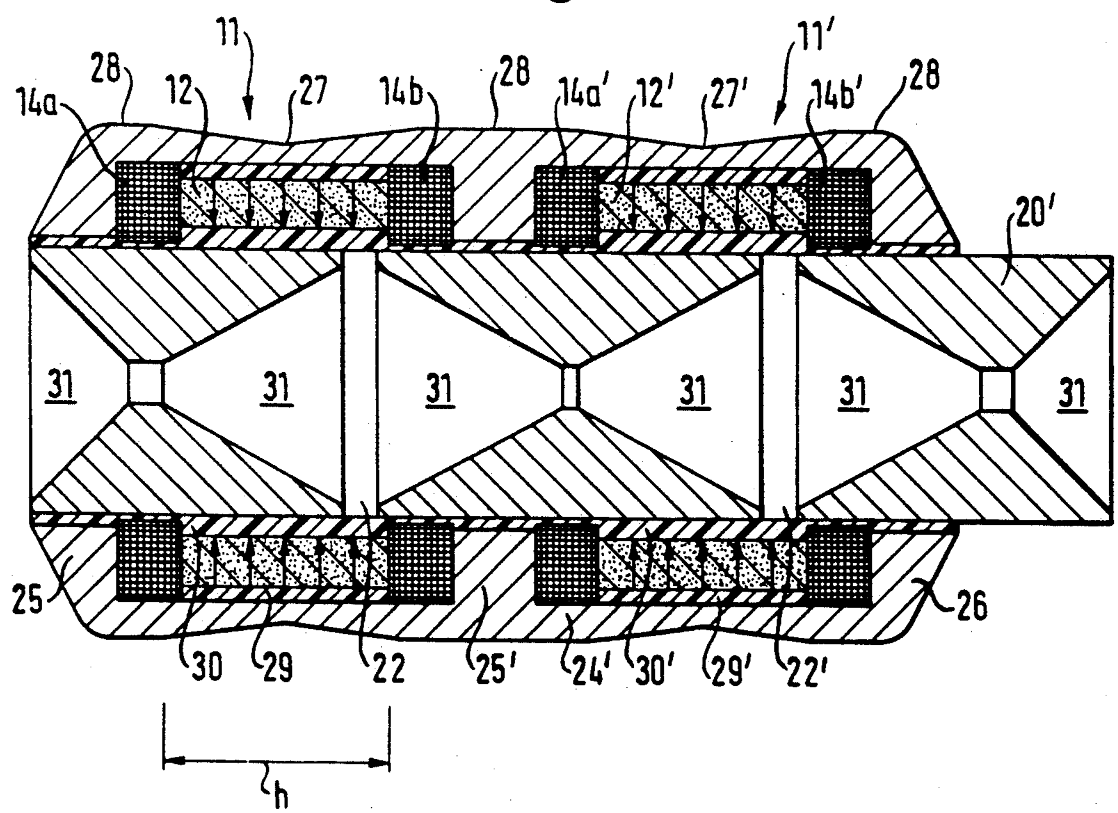
FIG. 5 shows an arrangement comprising two linear electric motor as shown in FIG. 4, with a common core of ferromagnetic material.

The same point also applies in like fashion to the embodiment shown in FIG. 5 in which two electric motors 11, 11' of the kind shown in FIG. 4 are connected to provide a unitary electric motor arrangement. Thus this structure has two permanent magnets 12, 12' of the same dimensions and two windings of the same dimensions, each of which is divided into two winding parts 14*a*, 14*b* and 14*a*', 14*b*' respectively. The configuration and arrangement of these magnets and windings is as was described above with reference to FIG. 4 so that there is no need for that description to be repeated here.

The magnets 12, 12' and the windings 14*a*, 14*b* and 14*a*', 14*b*' are immovably connected together and are so arranged that their longitudinal axes are aligned with each other. In that way a common core 20' which has two gaps 22, 22' extending transversely with respect to its longitudinal direction can extend through the substantially circular-cylindrical spaces within the two linear motors 11, 11'. The axial spacing between the two gaps 22, 22' is equal to the axial spacing between the two electric motors 11, 11', which is defined for example by the axial spacing between the end faces, which are at the right in FIG. 5, between the two permanent magnets 12 and 12'. The core 20' has six frustoconical recesses 31 which extend into the core coaxially with respect to its longitudinal axis from its end faces or from the two radially extending gaps 22, 22', in such a way that their reduced ends face towards each other. The recesses 31 serve to save weight and material and are so dimensioned that the remaining ferromagnetic material of the core 20' is everywhere sufficiently thick to be driven into saturation by the maximum magnetic flux which can pass through it in any position of the core 20'.

The winding-magnet arrangements of the two electric motors 11, 11' are enclosed by a common casing 24' of ferromagnetic material which together with the yokes 25, 25', 26 provides for annular closure of the magnetic flux lines with a low level of magnetic resistance, as was also described in relation to the preceding embodiments.

It should be pointed out that with this arrangement the magnetic flux which passes through the central yoke 25' which is common to both electric motors 11, 11' remains approximately the same for all positions of the two gaps 22, 22' when performing the stroke movement h and achieves approximately the magnitude of the maximum magnetic flux through one of the two outwardly disposed yokes 25, 26. The central yoke 25' can therefore be of the same axial length as one of the outside yokes 25, 26 without the risk of it being driven into a condition of magnetic saturation. Although the arrangement shown in FIG. 5 includes two electric motors 11, 11' of the kind shown in FIG. 4, its axial length is considerably less than twice the axial length of a single electric motor 11 because the number of turns in the windings is scarcely altered in comparison with an individual motor of the same strength.

The purpose of that double arrangement is to double the force acting between the stator and the movable part of the motor, with the conditions being otherwise the same. While it is admittedly possible to achieve such a doubling of force by using a correspondingly stronger permanent magnet 12 in an individual motor 11 as shown in FIG. 4, that however would require a larger core diameter, a yoke which is increased in size in the axial direction, and a thicker casing, because of the increased magnetic flux involved. In that case, with the thicker magnet, the outside diameter of the arrangement increases in an over-proportional fashion in particular when there is a wish to use inexpensive materials. Depending on the respective situation of use therefore it may certainly be advantageous, instead of a single motor 11 with a permanent magnet 12 which is twice as strong, to use the double arrangement illustrated in FIG. 5 in order to provide an inexpensive end product. It is also possible in the manner shown herein for more than two linear electric motors 11, 11' to be arranged in succession, in which case the foregoing points relating to the yoke 25' then also apply for each yoke which is disposed between two adjacent motors.

As a departure from the structure shown in FIG. 4, the casing 24' in FIG. 5 is of somewhat smaller wall thickness at the center 27, 27' of the axial length of the two permanent magnets 12, 12', than towards the end regions 28. That saving in terms of material and weight, which is also possible in all the above-described embodiments, may be made for the reason that those central regions have to carry a lower level of magnetic flux than the end regions 28. In addition, in FIG. 5 the annular free spaces between the inward side of the casing 24' and the outward peripheral surfaces of the permanent magnets 12, 12' and between the inside peripheral surfaces of the permanent magnets 12, 12' and the peripheral surface of the core 9' are filled with plastic bodies 29, 29' and 30, 30' which are not shown in FIG. 4 but which can likewise be used therein and of which the inner plastic bodies 30, 30' serve to support and guide the core 9'. A ferromagnetic liquid may again be provided in the gaps between the yokes 25, 25' and 26, and the core 9', in order to achieve the advantages already described above.

Referring to FIGS. 6 through 9, the rotary motor 51 shown therein includes a magnet arrangement which comprises at least two permanent magnets 52, 53, each of which is in the form of a hollow straight circular cylinder which is halved along a plane which contains the longitudinal axis. Those two semicylinders of the same dimensions are fitted together in such a way that they supplement each other to provide a closed hollow cylinder of circular inside and outside cross-sectional configuration. An important consideration in that respect is that the two semicylinders have oppositely directed directions of magnetisation if the endeavour is to involve optimum utilisation of the machine. If that premise is departed from, it is also possible to provide two magnets of which each covers only approximately a quarter of the overall periphery and which are then magnetised in the same direction. While the direction of the magnetic flux of the upper permanent magnet 52 in FIGS. 6 through 8 extends radially inwardly, that of the lower permanent magnet 53 is directed radially outwardly. The strength of the two magnets 52, 53 is the same. The winding arrangement comprises two windings 54, 56 which are of the same dimensions and which are each in the form of a straight hollow cylinder of circular inside and outside cross-sections. The windings 54, 56 which are actuated in the same direction in operation of the arrangement are so disposed at the ends of the hollow cylinder formed by the two permanent magnets 52, 53 that their axes are aligned with the longitudinal axis of the hollow cylinder. Here too that therefore forms a substantially circular-cylindrical internal space through which extends a core 55 of ferromagnetic material, which is mounted rotatably with respect to the winding-magnet arrangement, as indicated by the double-headed arrow R in FIG. 6.

Figure 9:
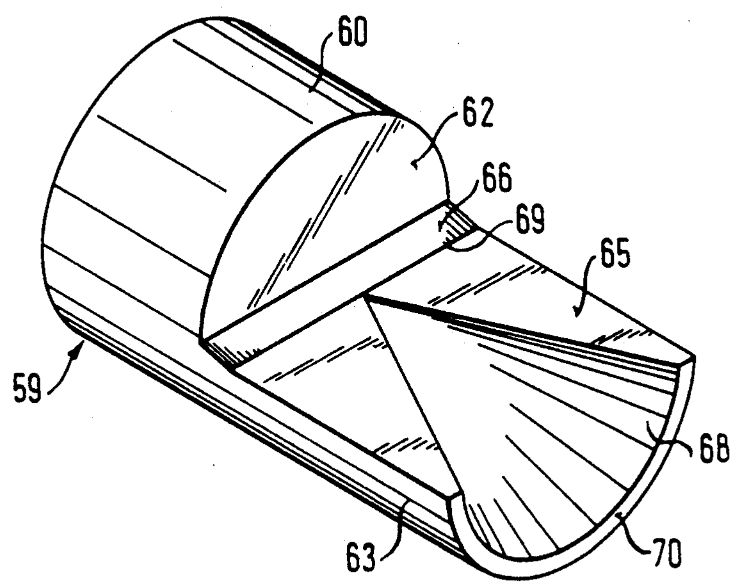
FIG. 9 is a perspective view of one half of the core of the rotary motor shown in FIG. 6.

Extending through the core 55 is a gap 58 which is formed by virtue of the core 55 being constructed from two halves 59, 59 of the same configuration, which are arranged at an axial spacing corresponding to the axial length of one of the windings 54, 56 and which are each of the configuration shown in the perspective view in FIG. 9. Each of the two halves 59, 59 of the core 55 has a circular-cylindrical portion 60 which is disposed axially outwardly in the assembled condition and the inwardly facing end face 62 of which is adjoined by a part-cylindrical portion 63. It is possible to envisage that part-cylindrical portion 63 being produced by cutting a region away from the full cylinder defined by the circular-cylindrical portion 60, along a plane which extends parallel to the longitudinal axis of the full cylinder and which is at a radial spacing therefrom. That spacing is of such a magnitude that the width of the respective portion 75 of the gap 58, which is to be found between the halves 59, 59 in the assembled condition, is approximately equal to double the width of the air gap between the core 55 and the magnets 52, 53.

In the transitional region between a first rectangular surface 65 which forms the flat side of the part-cylindrical portion 63 and the end face 62 of the circular-cylindrical portion 60 is a further rectangular surface 66 which extends over the entire width of the part-cylindrical portion 63, is of a small axial length in comparison with the first rectangular surface 65, and is so inclined relative to the plane of the first rectangular surface 65 that it rises towards the end face 62.

In that respect it continues the inclination of the central generatrix of a part-circular conical surface 68 which is formed as a recess in the first rectangular surface 65 in such a way that its axis extends parallel to the longitudinal axis of the half 59 of the core and its tip touches the edge 69 which is formed between the first rectangular surface 65 and the further rectangular surface 66. At its base the surface 68 is so dimensioned that the free end 70 of the part-cylindrical portion 63 is in the form of part of a narrow particular ring.

The core halves 59, 59 of the above-described configuration are arranged in the interior of the winding-magnet arrangement, with the above-mentioned axial spacing, in such a way that their longitudinal axes are aligned with each other and the first rectangular surfaces 65, 65 are disposed in mutually opposite and parallel relationship. Between the free end 70, in the form of part of a circular ring, of each half 59, and the end face 62 of the respective other half, is an axial spacing which is preferably equal to the axial length of each of the two windings 54, 56. The core 55 of ferromagnetic material which is formed in that way from the two halves 59, 59 and which has a gap 58 by virtue of the described configuration and arrangement of the halves 59, 59 is so positioned in the axial direction that each of the two end faces 62, 62 is aligned with the axially outwardly disposed end of the associated winding 54 and 56 respectively while each of the free ends 70, in the form of part of a circular ring, is disposed in the same cross-sectional plane as the axially inwardly disposed end of the associated winding 54, 56.

In other words: the core 55 of ferromagnetic material here has a gap 58 passing therethrough, the gap 58 including two portions 72, 74 which are substantially in the form of a semicircular disc, the axial thickness of which is approximately equal to the axial thickness of the winding 54 and 56 respectively and which in the assembled condition extend radially into the core 55 in the region of the two windings 54, 56 from mutually oppositely disposed sides. Those two radial portions 72, 74 are connected by a portion 75 which extends in the longitudinal direction and which, if the surfaces 68, 68 defining respective parts of a circular cone are disregarded, is substantially in the form of a shallow parallelepiped which is delineated by the rectangular surfaces 65, 65 and which extends transversely through the entire core 55. The surfaces 68, 68 which serve to increase the level of magnetic resistance and which also provide for a saving in respect of material and a reduction in weight have the result that a part-cone is 'fitted on to' respective ones of the two flat sides of the above-mentioned parallelepipedic part of the gap. The important consideration in that respect is that the gap 58 extends not only radially, as is the case in the above-described linear motors, but also extends in the axial direction over a length which bridges over the axial spacing between the two windings 54, 56.

The gap can again be filled with a solid material with a low level of magnetic permeability and which connects the two halves of the core to provide an overall body and which at the outer boundaries of the gap is so shaped and dimensioned that the overall body consisting thereof and the two core halves 59, 59 is in the form of a continuous straight circular cylinder.

The rotary motor 51 also provides that the winding-magnet arrangement is enclosed by a casing 76 of ferromagnetic material which provides for annular closure of the magnetic flux lines, jointly with two yokes 77, 78 which are fixedly connected to the casing 76. The casing 76 and the yokes 77 and 78 are of the same configuration and arrangement as was described above in relation to the linear motors.

The described arrangement and configuration of the gap 58 provides that upon a rotary movement of the core 55 the magnetic flux which passes through the two windings 54, 56 changes. If the arrangement is driven as a generator, that is to say the core 55 is caused to rotate by the action of an external mechanical torque, a voltage occurs at the windings 54, 56, which abruptly changes from plus to minus or vice-versa ($d\phi/dt$ changes its sign) whenever the 'parallelepipedic' portion 75 of the gap 58, which portion extends transversely through the entire core 55, moves over the junction 80 between the two permanent magnets 52, 53.

If conversely in the motor mode of operation a corresponding pulsating voltage which can be produced in a simple manner from a dc voltage is applied to the windings 54, 56, an electromagnetically generated torque acts on the core 55 which causes it to rotate and which can be outputted to the exterior.

Figure 7:
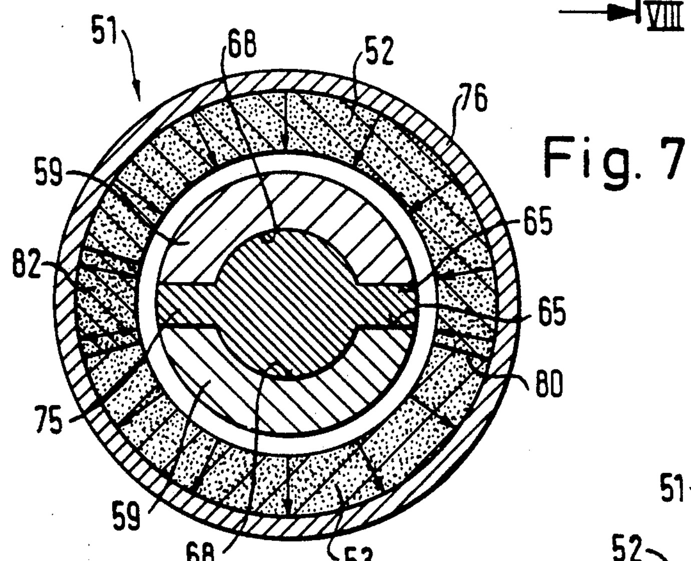
FIG. 7 is a view in section taken along line VII—VII through the rotary motor shown in FIG. 6.
Figure 8:
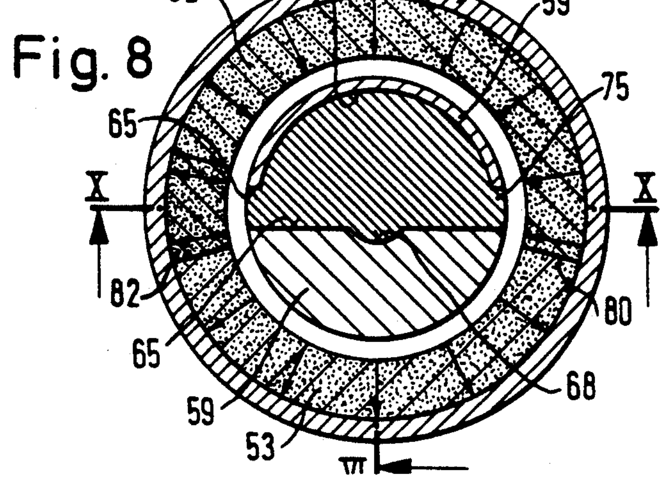
FIG. 8 is a view in section taken along line VIII—VIII through the rotary motor shown in FIG. 6.

In order to avoid starting difficulties occurring in the motor mode of operation because when the voltage is applied the gap 58 is precisely aligned with the junction 80 between the two magnets 52, 53, a small switchable magnet 82 can be disposed between the two permanent magnets 52, 53, as shown in FIGS. 7 and 8. The direction of magnetisation of the magnet 82 can be switched over by means of a coil (not shown) in such a way that in one case it is parallel to the direction of magnetisation of the permanent magnet 52 and in the other case it is parallel to the direction of magnetisation of the permanent magnet 53. That can give rise to an asymmetry in the magnet arrangement which in any situation ensures that the motor starts reliably in the respectively desired direction.

Another possible way of ensuring a satisfactory starting performance and reducing the above-mentioned output failure at least on a percentage basis provides causing two rotary motors 51 and 51' to act on one and the same core 55' which has two gaps 58, 58' which are turned relative to each other through 90°. The separating surfaces of the magnets 52, 53 and 52', 53' respectively of the two electric motors 51, 51' lie in the same plane. The parts shown in FIG. 10 have all been described already. They are denoted by corresponding references so that their structure and arrangement can be seen from the foregoing description.

Figure 6:
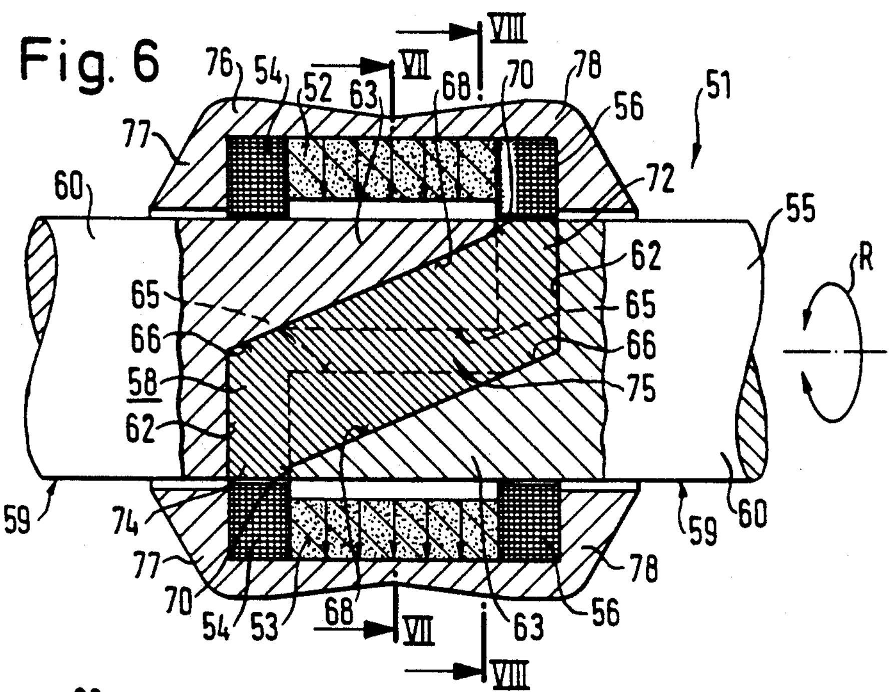
FIG. 6 is a view in vertical section through a rotary motor according to the invention.
Figure 10:
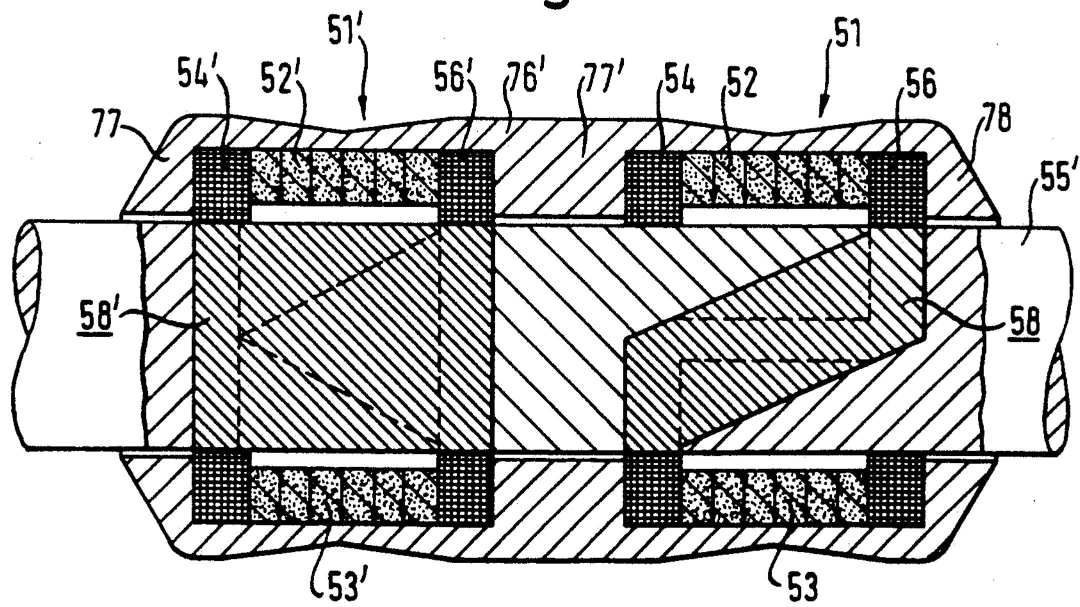
FIG. 10 shows an arrangement comprising two rotary motors as shown in FIG. 6, with a common core of ferromagnetic material.

It should be pointed out that the motor on the right in FIG. 10 is cut completely in the same plane as the motor 51 in FIG. 6 (see also section line VI—VI in FIG. 8) while the same section in relation to the core of the motor on the left in FIG. 10 extends in a plane which is indicated by the section line X—X in FIG. 8.

It should be emphasised again that, besides the electric motors described hereinbefore, there are further possible ways in which the concept of the invention can be carried into effect.

Thus for example 'air gaps' which extend transversely to the direction of movement may be provided both in the core and in the casing in the same cross-sectional plane and those two parts may be mechanically connected together for a joint relative movement with respect to the winding-magnet arrangement. The advantage of such an assembly is that the winding main flux is also halved so that the core diameter can be further reduced. In the present context the term winding main flux means the magnetic flux which is driven by the entire winding by way of the entire core, the yokes and the common casing. In contrast the winding transverse flux is a magnetic flux which is driven by the winding or parts thereof by way of a part of the core, by way of a yoke, by way of a part of the casing and at least by way of a part of the magnet.

It is further possible to arrange a plurality of winding-magnet arrangements which are actuable independently of each other, in succession in such a way that their longitudinal axes are aligned with each other and/or it is possible for the core or the casing to have a plurality of slits in order in that way to move long cores or casings over long distances. A plurality of winding-magnet arrangements for example with curved longitudinal axes may also be disposed on a circular path and used to accelerate an annular core, thereby also providing a rotary motor. In principle each of those motors can also be used as generators, that is to say, converting mechanical work into electrical energy.

Alternatively to the described embodiments the winding arrangement may also comprise a plurality of windings of which for example two are then positioned at the ends of the magnet arrangement while a third embraces the magnet or is embraced thereby.

The permanent magnets 12, 32 shown in FIGS. 2 and 3 may also be replaced by electromagnets. In principle it is also possible in FIG. 2 for the permanent magnet 12 to be arranged within the winding 14 and for the permanent magnet 32 in FIG. 3 to be disposed outside the winding 34. In FIG. 3 that results in an advantageous lower ohmic resistance in the winding 34. The embodiments in which the winding 14 or 34, as shown in FIGS. 2 and 3, is disposed between the permanent magnets 12 or 32 respectively and the body 20 or 44 respectively having the gap 22 or 42 respectively have on the other hand the advantage that in that case the permanent magnet is not endangered by the high field strengths which occur at the edges of the gap.

Figure 11:
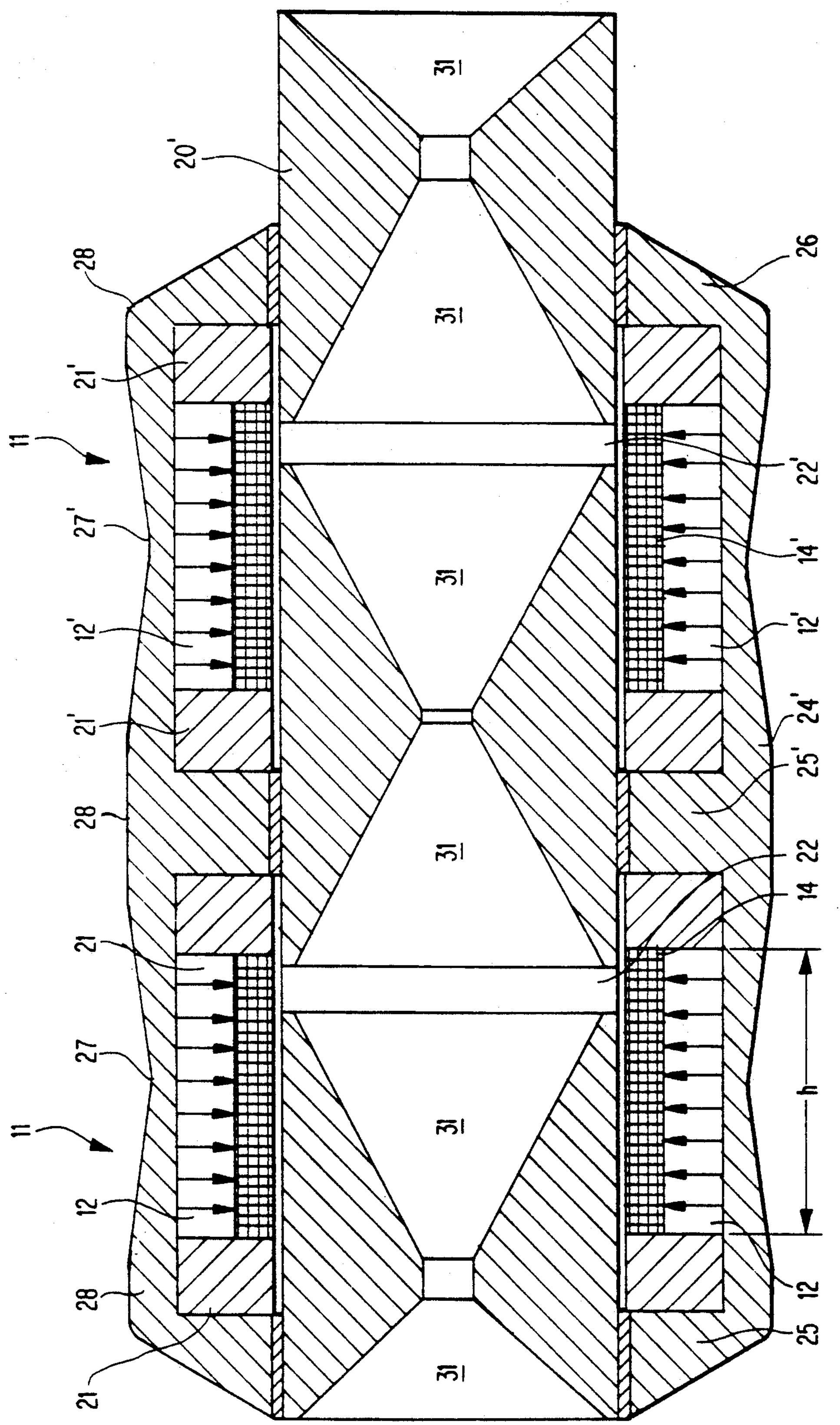
FIG. 11 shows another arrangement comprising two linear motors and combining features of FIGS. 2, 4 and 5.

FIG. 11 shows an embodiment having two motors with one common core (like FIG. 5), the motors having the same structure as that shown in FIG. 4 and being designed in a manner similar to that illustrated in FIG. 2. The reference numerals of FIG. 11 identify the components designated by the same reference numerals in the earlier drawing figures.

The linear motors according to the invention may either be operated in such a way that a direct current is permanently supplied thereto, such current being of a polarity corresponding to the desired direction of movement. As an alternative thereto it is also possible for them to be supplied with the electrical energy required for a given distance to be covered, in the form of individual pulses which are of appropriate polarity and which are separated from each other in respect of time.

Each of the electric motor structures described above can also be used as an electric generator.

What is claimed is:

1. A rotary electrical machine comprising a stator portion, a rotor portion, and mounting means adapted to permit a relative rotary movement therebetween, wherein said stator portion includes a winding arrangement consisting of first and second windings which are adapted to be actuated in the same sense and each of which is in the form of a coil enclosing a continuous internal space, means for a flow of electrical current through the winding arrangement in operation of the machine, wherein said rotor portion includes a core means in the form of an elongate body which at least partially comprises ferromagnetic material, and is common to both windings by extending through the internal spaces surrounded by them, said windings being arranged at a spacing from each other in the longitudinal direction of the core means, wherein said stator portion further includes a magnet arrangement consisting of first and second magnets which are arranged in mutually opposite relationship with respect to the longitudinal axis of said core means in the spacing between said first and second windings, each of said first and second magnets partially embracing said core means, and at any time in operation of the machine the magnetization direction of at least one magnet being directed from the outside towards the core means whilst that of at least one magnet being directed from the core means outwardly, said winding arrangement and said magnet arrangement being mounted immovably with respect to each other at least in the direction of said relative linear movement, and said core means being mounted rotatably around its longitudinal axis with respect to said magnet arrangement and said winding arrangement, the flux of said magnet arrangement passing through the peripheral surface of the core means transversely to the longitudinal direction of the latter and being deflected in the interior of said core means in the longitudinal direction thereof, said core means having at least one gap which extends with a direction component which is transverse with respect to the longitudinal direction of the core means and also a direction component which is in the longitudinal direction of the core means, said gap being filled with material of low magnetic permeability, so that by virtue of its relative rotary movement with respect to said winding and magnet arrangements the magnetic flux in the winding arrangement alters.

2. A machine as set forth in claim 1 wherein said gap extends in the longitudinal direction of the core means to such an extent that in the assembled condition it bridges over the axial spacing between said first and second windings.

3. A machine as set forth in claim 2, wherein the windings and the magnet arrangement are each in the form of a straight hollow cylinder with circular inside and outside cross-sections and are so arranged that their longitudinal axes are aligned with each other.

4. A machine as set forth in claim 1 and further including at least one further magnet which covers only a small part of the periphery of the core means and means for switching over the direction of magnetization of said further magnet in such a way that it corresponds selectively to the magnetization direction of the one of said first and second magnets or the direction of magnetization of the other of said first and second magnets.

5. A machine as set forth in claim 1 and further including: a casing means in the form of an elongate body which at least partially comprises ferromagnetic material and which surrounds the winding and magnet arrangements from the outside so that its longitudinal axis is at least substantially parallel to the longitudinal axes of said winding and magnet arrangements, and at least first and second yokes of ferromagnetic material and of such a configuration and arrangement that with the casing means they form a return path arrangement of defined magnetic resistance for the magnetic flux which passes through the core means.

6. A machine as set forth in claim 5 wherein said yokes are fixedly connected to the casing means and the casing means is connected to the assembly comprising the winding arrangement and the magnet arrangement immovably at least in the direction of said relative rotary movement, wherein further the yokes have continuous openings in the longitudinal direction, which permit a relative rotary movement of the core means which passes through them, the gaps between the core means and the yokes forming a lower level of magnetic resistance than the gap which passes through the core means.

7. A machine as set forth in claim 1 wherein said at least one gap in the core means is filled with a solid material of low magnetic permeability, which with parts of the core means which are of ferromagnetic material forms an overall body with continuous external contures.

8. A machine as set forth in claim 1 in the form of an electrical motor.

9. An electrical motor assembly comprising at least first and second electrical motors as set forth in claim 8 including means for connecting all the winding and magnet arrangements together immovably at least in the direction of the relative rotary movement, wherein said core means which at least partially comprises ferromagnetic material is common to the motors, the core means having a gap for each motor, and means for actuating the winding arrangements such that the forces occurring between the winding and magnet arrangements of each motor and the common core means act in the same direction to produce a relative rotary movement.

10. An assembly as set forth in claim 9, including a casing common to the electrical motors and including a plurality of yoke means of which at least one is associated with the first and second electrical motors.

11. A machine as set forth in claim 1 wherein said magnet arrangement is formed by permanent magnet means.

12. A machine as set forth in claim 1 wherein the thickness of material and shape of the core, the yoke means and the casing means in the various cross-sectional regions are so matched to the magnetic flux which passes through the respective cross-sectional region at the maximum that saturation is avoided with the minimum requirement of material.

13. An electrical machine as set forth in claim 1 in the form of an electrical generator.

14. A linear electrical machine comprising a stator portion, a reaction portion, and mounting means adapted to permit a relative movement therebetween, wherein said stator portion includes a winding arrangement consisting of at least one winding in the form of an elongate hollow body having a continuous internal space, means for a flow of electrical current through the winding arrangement in operation of the machine, a magnet arrangement consisting of at least one magnet in the form of an elongate hollow body, the direction of magnetization of which extends at least substantially perpendicularly to its longitudinal axis, and which encloses a continuous internal space, said winding arrangement and said magnet arrangement being mounted immovably with respect to each other at least in the direction of said relative linear movement, one of said winding and magnet arrangements concentrically surrounding the respective other arrangement so that the longitudinal axis of the magnet arrangement extends at least substantially parallel to the longitudinal axis of the winding arrangement, whereby the field of said magnet arrangement passes through said winding arrangement, and wherein said reaction portion includes a core means in the form of an elongate body which at least partially comprises ferromagnetic material, and extends through a hollow space surrounded by said winding and magnet arrangements so that its longitudinal axis is at least substantially parallel to the longitudinal axes of said winding and magnet arrangements, said core means being mounted movably with respect to said winding and magnet arrangements in its longitudinal direction for said relative linear movement, and having at least one gap which extends transversely with respect to said direction and is filled with material of low magnetic permeability and is so arranged that by virtue of its relative linear movement with respect to the winding and magnet arrangements the magnetic flux generated by the magnet arrangement as well as the magnetic flux generated by the winding arrangement changes its direction in the region where it passes through said core means.

15. A machine as set forth in claim 14 wherein said stator portion further includes: a casing means in the form of an elongate body which at least partially comprises ferromagnetic material and which surrounds the winding and magnet arrangements from the outside so that its longitudinal axis is at least substantially parallel to the longitudinal axes of said winding and magnet arrangements, and at least first and second yokes of ferromagnetic material and of such a configuration and arrangement that with the casing means they form a return path arrangement of defined magnetic resistance for the magnetic flux which passes through the core means.

16. A machine as set forth in claim 15 wherein said yokes are fixedly connected to the casing means and the casing means is connected to the assembly comprising the winding arrangement and the magnet arrangement immovably at least in the direction of said relative linear movement, wherein further the yokes have continuous openings in the longitudinal direction, which permit a relative movement of the core means which passes through them, the gaps between the core means and the yokes forming a lower level of magnetic resistance than the gap which passes through the core means.

17. A machine as set forth in claim 14 wherein said at least one gap in the core means is filled with a solid material of low magnetic permeability, which with parts of the core means which are of ferromagnetic material forms an overall body with continuous external contures.

18. A machine as set forth in claim 14 in the form of an electrical motor.

19. An electrical motor assembly comprising at least first and second electrical motors as set forth in claim 18 including means for connecting all the winding and magnet arrangements together immovably at least in the direction of the relative linear movement, wherein said core means which at least partially comprises ferromagnetic material is common to the motors, the core means having a gap for each motor, and means for actuating the winding arrangements such that the forces occurring between the winding and magnet arrangements of each motor and the common core means act in the same direction to produce a relative linear movement.

20. An assembly as set forth in claim 19, including a casing common to the electrical motors and including a plurality of yoke means of which at least one is associated with the first and second electrical motors.

21. A linear electrical machine comprising a stator portion, a reaction portion, and mounting means adapted to permit a relative movement therebetween, wherein said reaction portion includes a winding arrangement consisting of at least one winding in the form of an elongate hollow body having a continuous internal space, means for a flow of electrical current through the winding arrangement in operation of the machine, a magnet arrangement consisting of at least one magnet in the form of an elongate hollow body, the direction of magnetization of which extends at least substantially perpendicularly to its longitudinal axis, and which encloses a continuous internal space, said winding arrangement and said magnet arrangement being mounted immovably with respect to each other at least in the direction of said relative linear movement, one of said winding and magnet arrangements concentrically surrounding the respective other arrangement so that the longitudinal axis of the magnet arrangement extends at least substantially parallel to the longitudinal axis of the winding arrangement, whereby the field of said magnet arrangement passes through said winding arrangement, and wherein said stator portion includes a core means in the form of an elongate body which at least partially comprises ferromagnetic material, and extends through a hollow space surrounded by said winding and magnet arrangements so that its longitudinal axis is at least substantially parallel to the longitudinal axes of said winding and magnet arrangements, said core means being mounted movably with respect to said winding and magnet arrangements in its longitudinal direction for said relative linear movement, and having at least one gap which extends transversely with respect to said direction and is filled with material of low magnetic permeability and is so arranged that by virtue of its relative linear movement with respect to the winding and magnet arrangements the magnetic flux generated by the magnet arrangement as well as the magnetic flux generated by the winding arrangement changes its direction in the region where it passes through said core means.

22. A machine as set forth in claim 21 wherein said reaction portion further includes: a casing means in the form of an elongate body which at least partially comprises ferromagnetic material and which surrounds the winding and magnet arrangements from the outside so that its longitudinal axis is at least substantially parallel to the longitudinal axes of said winding and magnet arrangements, and at least first and second yokes of ferromagnetic material and of such a configuration and arrangement that with the casing means they form a return path arrangement of defined magnetic resistance for the magnetic flux which passes through the core means.

23. A machine as set forth in claim 22 wherein said yokes are fixedly connected to the casing means and the casing means is connected to the assembly comprising the winding arrangement and the magnet arrangement immovably at least in the direction of said relative linear movement, wherein further the yokes have continuous openings in the longitudinal direction, which permit a relative movement of the core means which passes through them, the gaps between the core means and the yokes forming a lower level of magnetic resistance than the gap which passes through the core means.

24. A machine as set forth in claim 21 wherein said at least one gap in the core means is filled with a solid material of low magnetic permeability, which with parts of the core means which are of ferromagnetic material forms an overall body with continuous external contures.

25. A machine as set forth in claim 21 in the form of an electrical motor.

26. An electrical motor assembly comprising at least first and second electrical motors as set forth in claim 25 including means for connecting all the winding and magnet arrangements together immovably at least in the direction of the relative linear movement, wherein said core means which at least partially comprises ferromagnetic material is common to the motors, the core means having a gap for each motor, and means for actuating the winding arrangements such that the forces occurring between the winding and magnet arrangements of each motor and the common core means act in the same direction to produce a relative linear movement.

27. An assembly as set forth in claim 26, including a casing common to the electrical motors and including a plurality of yoke means of which at least one is associated with the first and second electrical motors.

28. A linear electrical machine comprising a stator portion, a reaction portion, and mounting means adapted to permit a relative linear movement therebetween, wherein said stator portion includes a winding arrangement consisting of at least one winding in the form of an elongate hollow body having a continuous internal space, means for a flow of electrical current through the winding in operation of the machine, a magnet arrangement consisting of at least one magnet in the form of an elongate hollow body, the direction of magnetization of which extends at least substantially perpendicularly to its longitudinal axis, and which encloses a continuous internal space, said winding arrangement and said magnet arrangement being mounted immovably with respect to each other at least in the direction of said relative linear movement, one of said winding and magnet arrangements concentrically surrounding the respective other arrangement so that the longitudinal axis of the magnet arrangement extends at least substantially parallel to the longitudinal axis of the winding arrangement, whereby the field of said magnet arrangement passes through said winding arrangement, and wherein said reaction portion includes a casing means in the form of an elongate body which at least partially comprises ferromagnetic material, and surrounds the winding and magnet arrangements from the outside so that its longitudinal axis is at least substantially parallel to the longitudinal axes of said winding and magnet arrangements, said casing means being mounted movably with respect to said winding and magnet arrangements in its longitudinal direction for said relative linear movement, and having at least one gap which extends transversely with respect to said direction and is filled with material of low magnetic permeability and is so arranged that by virtue of its relative linear movement with respect to the winding and magnet arrangements the magnetic flux generated by the magnet arrangement as well as the magnetic flux generated by the winding arrangement changes its direction in the region where it passes through said core means.

29. A machine as set forth in claim 28 wherein said stator portion further includes: a core means in the form of an elongate body which at least partially comprises ferromagnetic material and which extends through a hollow space surrounded by said winding and magnet arrangements so that its longitudinal axis is at least substantially parallel to the longitudinal axes of said winding and magnet arrangements, and at least first and second yokes of ferromagnetic material and of such a configuration and arrangement that with the core means they form a return path arrangement of defined magnetic resistance for the magnetic flux which passes through the casing means.

30. A machine as set forth in claim 29 wherein said yokes are fixedly connected to the core means and the core means is connected to the assembly comprising the winding arrangement and the magnet arrangement immovably at least in the direction of said relative linear movement, wherein further the casing means surrounds the yokes and is separated from them by gaps which permit a relative movement of the casing means and form a lower level of magnetic resistance than the gap which passes through the casing means.

31. A machine as set forth in claim 28 wherein that at least one gap in the casing means is filled with a solid material of low magnetic permeability, which with parts of the casing means which are of ferromagnetic material forms an overall body with continuous internal contures.

32. A machine as set forth in claim 28 in the form of an electrical motor.

33. An electrical motor assembly comprising at least first and second electrical motors as set forth in claim 32, including means for connecting all the winding and magnet arrangements together immovably at least in the direction of the relative linear movement, wherein said casing means which at least partially comprises ferromagnetic material is common to the motors, the casing means having a gap for each motor, and means for actuating the winding arrangements such that the forces occurring between the winding and magnet arrangements of each motor and the common casing means act in the same direction to produce a relative linear movement.

34. An assembly as set forth in claim 33 including a core common to the electrical motors and including a plurality of yoke means of which at least one is associated with the first and second electrical motors.

35. A linear electrical machine comprising a stator portion, a reaction portion, and mounting means adapted to permit a relative linear movement therebetween, wherein said reaction portion includes a winding arrangement consisting of at least one winding in the form of an elongate hollow body having a continuous internal space, means for a flow of electrical current through the winding in operation of the machine, a magnet arrangement consisting of at least one magnet in the form of an elongate hollow body, the direction of magnetization of which extends at least substantially perpendicularly to its longitudinal axis, and which encloses a continuous internal space, said winding arrangement and said magnet arrangement being mounted immovably with respect to each other at least in the direction of said relative linear movement, one of said winding and magnet arrangements concentrically surrounding the respective other arrangement so that the longitudinal axis of the magnet arrangement extends at least substantially parallel to the longitudinal axis of the winding arrangement, whereby the field of said magnet arrangement passes through said winding arrangement, and wherein said stator portion includes a casing means in the form of an elongate body which at least partially comprises ferromagnetic material, and surrounds the winding and magnet arrangements from the outside so that its longitudinal axis is at least substantially parallel to the longitudinal axes of said winding and magnet arrangements, said casing means being mounted movably with respect to said winding and magnet arrangements in its longitudinal direction for said relative linear movement, and having at least one gap which extends transversely with respect to said direction and is filled with material of low magnetic permeability and is so arranged that by virtue of its relative linear movement with respect to the winding and magnet arrangements the magnetic flux generated by the magnet arrangement as well as the magnetic flux generated by the winding arrangement changes its direction in the region where it passes through said core means.

36. A machine as set forth in claim 35 wherein said reaction portion further includes: a core means in the form of an elongate body which at least partially comprises ferromagnetic material and which extends through a hollow space surrounded by said winding and magnet arrangements so that its longitudinal axis is at least substantially parallel to the longitudinal axes of said winding and magnet arrangements, and at least first and second yokes of ferromagnetic material and of such a configuration and arrangement that with the core means they form a return path arrangement of defined magnetic resistance for the magnetic flux which passes through the casing means.

37. A machine as set forth in claim 36 wherein said yokes are fixedly connected to the core means and the core means is connected to the assembly comprising the winding arrangement and the magnet arrangement immovably at least in the direction of said relative linear movement, wherein further the casing means surrounds the yokes and is separated from them by gaps which permit a relative movement of the casing means and form a lower level of magnetic resistance than the gap which passes through the casing means.

38. A machine as set forth in claim 35 wherein that at least one gap in the casing means is filled with a solid material of low magnetic permeability, which with parts of the casing means which are of ferromagnetic material forms an overall body with continuous internal contures.

39. A machine as set forth in claim 35 in the form of an electrical motor.

40. An electrical motor assembly comprising at least first and second electrical motors as set forth in claim 39, including means for connecting all the winding and magnet arrangements together immovably at least in the direction of the relative linear movement, wherein said casing means which at least partially comprises ferromagnetic material is common to the motors, the casing means having a gap for each motor, and means for actuating the winding arrangements such that the forces occurring between the winding and magnet arrangements of each motor and the common casing means act in the same direction to produce a relative linear movement.

41. An assembly as set forth in claim 40 including a core common to the electrical motors and including a plurality of yoke means of which at least one is associated with the first and second electrical motors.

42. A machine as set forth in claim 14 or 21 or 28 or 35 wherein the axial length of the magnet arrangement is at least substantially equal to the axial length of the winding arrangement.

43. A machine as set forth in claim 14 or 21 or 28 or 35 wherein both the winding and the magnet arrangements are each in the form a straight hollow cylinder of circular inside and outside cross-sections and wherein the longitudinal axes of the winding arrangement and the magnet arrangement coincide.

44. A machine as set forth in claim 14 or 21 or 28 or 35 wherein the winding arrangement surrounds the magnet arrangement.

45. A machine as set forth in claim 14 or 21 or 28 or 35 wherein the magnet arrangement surrounds the winding arrangement.

46. A machine as set forth in claim 14 or 21 or 28 or 35 wherein said magnet arrangement is formed by permanent magnet means.

47. A machine as set forth in claim 15 or 22 or 29 or 36 wherein the thickness of material and shape of the core, the yoke means and the casing means in the various cross-sectional regions are so matched to the magnetic flux which passes through the respective cross-sectional region at the maximum that saturation is avoided with the minimum requirement requirement of material.

48. An electrical machine as set forth in claim 14 or 21 or 28 or 35 in the form of an electrical generator.

* * * * *